United States Patent [19]
Ross

[11] Patent Number: 6,048,040
[45] Date of Patent: Apr. 11, 2000

[54] VEHICLE BRAKING SYSTEM WITH DRIVE WHEEL SLIP CONTROL

[75] Inventor: Colin Ford Ross, Worcestershire, United Kingdom

[73] Assignee: Haldex Brake Products Limited, United Kingdom

[21] Appl. No.: 08/930,103

[22] PCT Filed: May 13, 1996

[86] PCT No.: PCT/GB96/01153

§ 371 Date: May 12, 1998

§ 102(e) Date: May 12, 1998

[87] PCT Pub. No.: WO96/35598

PCT Pub. Date: Nov. 14, 1996

[30] Foreign Application Priority Data

May 13, 1995 [GB] United Kingdom ............ 9509740

[51] Int. Cl.[7] .............................................. B60T 8/36
[52] U.S. Cl. .................................. 303/119.1; 303/127
[58] Field of Search ........................ 303/119.1, 7, 123, 303/181 C, 118.1, 150, 170, 113.2, 3, 15, 127, 133

[56] References Cited

U.S. PATENT DOCUMENTS

| | | |
|---|---|---|
| 4,156,547 | 5/1979 | Marsh . |
| 4,260,199 | 4/1981 | Reinecke .................................. 303/127 |
| 4,616,881 | 10/1986 | Muller et al. ............................... 303/7 |
| 4,819,998 | 4/1989 | Goebels et al. ....................... 303/118.1 |
| 4,852,953 | 8/1989 | Brearley et al. ......................... 303/148 |

FOREIGN PATENT DOCUMENTS

| | | |
|---|---|---|
| 26 25 502A1 | 12/1977 | Germany . |
| 28 10 219A1 | 9/1979 | Germany . |
| 1578068 | 10/1980 | United Kingdom . |
| 1588909 | 4/1981 | United Kingdom . |
| 1599867 | 10/1981 | United Kingdom . |
| 2 125 912A | 3/1984 | United Kingdom . |
| 2 276 687A | 10/1994 | United Kingdom . |
| WO9511823 | 5/1995 | WIPO . |

*Primary Examiner*—Christopher P. Schwartz
*Assistant Examiner*—Melanie Talavera
*Attorney, Agent, or Firm*—Leydig, Voit & Mayer, Ltd.

[57] ABSTRACT

A braking system comprising an anti-lock vehicle braking system for a vehicle having a pair of drive wheels (13, 14), the wheels of said pair being disposed on opposite sides of the vehicle, comprising a wheel speed sensor (17, 18) for each wheel (13, 14), a controller (19) responsive to wheel speed signals from said two wheel speed sensors (17, 18) for sensing skid conditions at said wheels (13, 14) and for generating skid control instructions, a wheel brake (23, 24) for each wheel (13, 14), responsive to fluid pressure, hereinafter referred to as brake pressure, supplied thereto, a common supply line (37), for supplying a common brake pressure for both of said brakes from a fluid pressure supply valve means (38) in accordance with a brake demand signal and a skid control means (40) controlled by said skid control instructions for modulating the common brake pressure, having a brake apply valve (51) to supply fluid under pressure to the common supply valve (39), in response to the controller detecting a wheel spin condition of one of said wheels (13, 14), to provide a common brake pressure for both of said brakes and isolating means (42, 43) to isolate the brake (23, 24) associated with the other of said wheels (13, 14) from the brake pressure.

15 Claims, 4 Drawing Sheets

FIG_1

VEHICLE BRAKING SYSTEM WITH DRIVE WHEEL SLIP CONTROL

DESCRIPTION OF INVENTION

This invention relates to an anti-lock vehicle braking system for a vehicle having a pair of drive wheels, the wheels of said pair being disposed on opposite sides of the vehicle, comprising a wheel speed sensor for each wheel, a controller responsive to wheel speed signals from said two wheel speed sensors, for sensing skid conditions at said wheels and for generating skid control instructions, a wheel brake for each wheel, responsive to fluid pressure, hereinafter referred to as brake pressure, supplied thereto, a common supply line, for supplying a common brake pressure for both of said brakes from a fluid pressure supply in accordance with a brake demand signal and a skid control means controlled by said skid control instructions for modulating the common brake pressure. Such a braking system will be referred to hereinafter as being of the kind specified.

A braking system of the kind specified provides an effective anti-lock braking system without the need for a separate skid control means for each wheel brake to provide independent brake pressure. This can be achieved by utilising adaptive logic in the controller to switch between a "select low" or a "select high" mode in which the controller is responsive to the speed of the wheel which is in engagement with the lower friction surface or the wheel which is in engagement with the higher friction surface respectively.

However, hitherto it has not been possible for such an anti-lock brake system having two wheel speed sensors and a single skid control means, to provide wheel slip control (ASR). It is a requirement of ASR control to be able to apply the brakes of one wheel which is spinning on a low friction surface to enable the higher friction surface on the opposite side of the vehicle to be utilised, thereby improving acceleration. With the anti-lock system as described above where only one skid control means controls both wheels, in the case of one wheel spinning it is only possible to apply or release the brakes on both sides of the vehicle, which is of no value for ASR control.

Accordingly, it is an object of the present invention to provide an anti-lock vehicle braking system of the kind specified with an ASR facility.

According to the present invention we provide a braking system of the kind specified, having a brake apply valve to supply fluid under pressure to the common supply valve, in response to the controller detecting a wheel spin condition of one of said wheels, to provide a common brake pressure for both of said brakes and isolating means to isolate the brake associated with the other of said wheel brakes from the brake pressure.

In one more specific aspect said brake pressure is a pneumatic brake pressure comprising air or other gas, hereinafter referred to as air.

The air may be supplied from a supply such as a reservoir for air under pressure.

Said common supply valve may comprise an in-line valve.

In this case the air to provide said pneumatic brake pressure may be fed from the air supply to the common supply valve under the control of a brake pressure demand valve which may be manually operable or said brake apply valve and which provides said brake demand signal.

Alternatively, said common supply valve may comprise a relay valve.

In this case the air to provide said pneumatic brake pressure may be fed from the air supply to the common supply valve and a brake demand signal may be supplied to the common supply valve under the control of a brake pressure demand valve which may be manually operable or said brake apply valve.

In another more specific aspect the said brake pressure is a hydraulic brake pressure comprising a liquid such as oil, hereinafter referred to as hydraulic fluid.

The system may comprise a fluid pressure converter responsive to a pneumatic signal to provide a hydraulic brake pressure which is supplied to the vehicle brakes.

The air providing said pneumatic signal may be fed to said converter by said common supply valve.

Said common supply valve may comprise an in-line valve.

In this case the air to provide said pneumatic signal may be fed from the air supply to the common supply valve under the control of a brake pressure demand valve which may be manually operable or said brake apply valve and which provides said brake demand signal.

Alternatively, said common supply valve may comprise a relay valve.

In this case the air to provide said pneumatic signal may be fed from the air supply to the common supply valve and a brake demand signal may be supplied to the common supply valve under the control of a brake pressure demand valve which may be manually operable or said brake apply valve.

In either more specific aspect:

A double check valve may be provided between the brake apply valve, the manually operable brake demand valve and the common supply valve.

The isolating valves may each comprise a solenoid operated valve adapted to prevent flow of fluid therethrough when the solenoid is energised.

The skid control means may be operable to provide a control of the brake pressure selected from the following modes: permit exhaust of brake pressure to atmosphere or a low pressure region; hold brake pressure at the pressure obtaining in the vehicle brakes; permit stepwise brake pressure increase.

When a spin condition of said one wheel is detected, the controller may energise the brake apply valve and energise the isolating valve associated with the other wheel brake to cause stepwise pressure rise.

The skid control means may comprise two solenoids.

One of said solenoids (exhaust solenoid) may connect the brake chambers to atmosphere in a low pressure region and the other of said solenoids (hold solenoid) may block passage of air therethrough.

In a first mode the exhaust and hold solenoids are energised so as to release brake pressure from the vehicle brakes.

In a second mode the hold solenoid is energised and the exhaust solenoid is de-energised. Brake pressure is held at the level obtaining in the brakes.

In a third mode the hold solenoid is repeatedly energised and de-energised and the exhaust solenoid is de-energised. Brake pressure is increased in a stepwise manner.

Examples of the invention will now be described with reference to the accompanying drawings wherein.

In this specification the same reference numerals have been used to refer to corresponding parts throughout the drawings.

Figure 1:
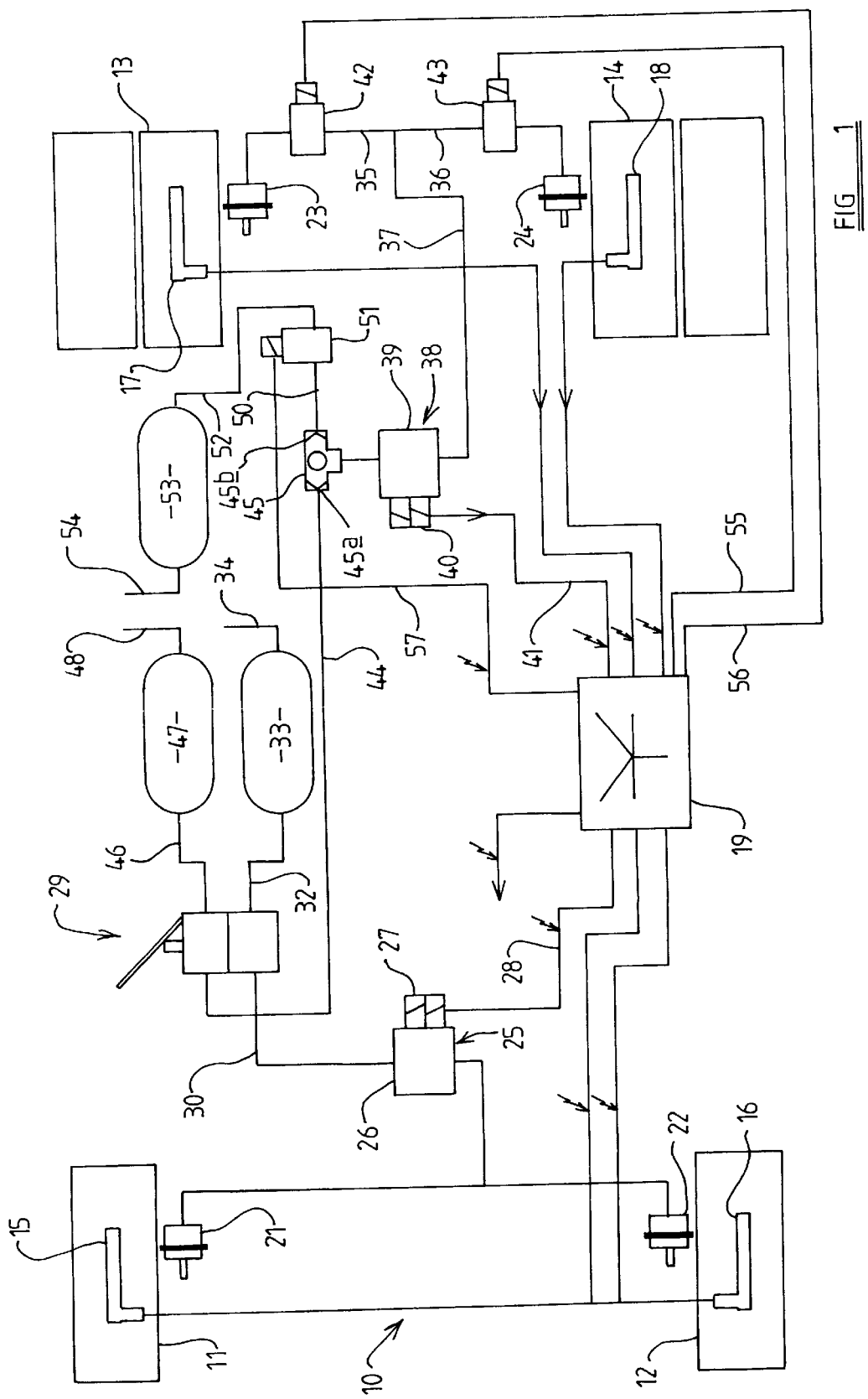
FIG. 1 is a diagrammatic illustration of a first brake system embodying the invention.

Referring to FIG. 1 there is shown a vehicle brake system in which a vehicle 10 has a right-hand front wheel 11 and a left-hand front wheel 12 and a right-hand rear wheel 13 and a left-hand rear wheel 14.

The rear wheels 13, 14 are driven in conventional manner and are typically carried at opposite ends of a beam axle but they may be independently suspended wheels carried from a chassis or body of the vehicle on opposite sides thereof.

Each front wheel 11, 12 has a wheel speed sensor 15, 16 whilst the rear wheels each have a wheel speed sensor 17, 18 respectively. Outputs from the wheel speed sensors 15–18 are fed to an electronic controller 19. Wheel brakes 21, 22 are provided for the front wheels, whilst wheel brakes 23, 24 are provided for the rear wheels. In this embodiment the wheel brakes are pneumatically actuated wheel brakes of conventional kind.

Pneumatic brake pressure is fed to the wheel brakes 21, 22 to provide a common brake pressure thereto from a front supply valve means 25 comprising a supply valve 26 and a skid control means 27 which is controlled by skid control instructions provided on line 28 from the controller 19. Air is supplied to the supply valve means 25, by a manually operable brake demand valve 29 on line 30. The demand valve 29 is provided with air for this purpose on line 32 from a front air reservoir 33 which is charged with air on line 34 in known manner.

The rear wheel brakes 23, 24 are supplied with common pneumatic brake pressure on lines 35, 36 which run from a line 37 extending from a rear supply means 38 comprising a common supply valve 39 and a skid control means 40. The skid control means are controlled by skid control instructions provided on line 41 by the controller 19.

A right-hand solenoid operated isolating valve 42 is provided on the line 35 and a left-hand solenoid operated isolating valve 43 is provided on the line 36.

Air is supplied to the supply valve means 39 on line 44 via a double check valve 45. The line 44 feeds air to a first inlet port 45a thereof from an upper part of the valve 29 which is supplied with air on line 46 from a rear fluid pressure reservoir 47 which is charged in conventional manner on line 48. A second inlet port 45b of the double check valve 45 is connected by line 50 to a solenoid operated brake apply valve 51 which is supplied with air on line 52 from brake apply reservoir 53 charged in conventional manner on line 54.

The isolating valves 42, 43 are controlled by an electrical signal supplied by the controller 19 on line 55, 56 respectively whilst the brake apply valve 51 is controlled by an electrical signal supplied on line 57 from a controller 19.

The supply valves 26, 39 are conventional in-line valves and the skid control means are of conventional kind comprising two solenoid operated valves, one (exhaust) valve of which connects the associated brake chambers to atmosphere or, if desired, to a low pressure region, and the other (holding) valve of which blocks movement of fluid to or from the associated wheel brake, in both cases when the solenoid is energised.

Accordingly, when the solenoids of both the exhaust and hold valves are energised air pressure is released from the associated brake chambers.

When only the solenoid of the hold valve is energised pressure is held at the level obtaining at that time in the associated brake chambers.

When the solenoid of the hold valve is de-energised and energised in a controlled manner, whilst the solenoid of the exhaust valve remains de-energised, a stepwise pressure increase is achieved in the associated brakes.

When it is desired to brake the vehicle the driver applies the brakes at the valve 29 and, describing firstly the front wheels, a brake demand signal is fed on the line 30 to the supply means 25. In the absence of any tendency to skid the supply valve 26 will supply fluid pressure in accordance with the brake demand signal to the brakes 21, 22. If there is a tendency to skid the skid control unit 27 will operate in a desired one or combination of the above mentioned three control modes either initially to hold the brake pressure and then allow it to rise in a controlled manner, or initially to hold the brake pressure and then drop the brake pressure followed by rise.

By virtue of adaptive logic provided in the controller 19 the front brakes are controlled either on a select "low" or a select "high" basis as appropriate, as described for example in our application no. GB-A-2,276,687.

Referring now to the rear wheels, again driver application causes air to be fed on line 44 via check valve 45 to the supply valve 39 and, in the absence of any tendency of wheels skidding, the thus supplied brake demand signal causes brake pressure to be fed on lines 37, 35 and 36 to the rear wheel brakes 23, 24.

If a tendency to skid is detected by the controller 19 the skid control means modulates the brake pressure otherwise supplied by the valve 39 in the manner as described hereinbefore. Again adaptive logic is used to operate on either a select high or a select low basis.

If a slip condition of one wheel occurs on acceleration the controller 19 first signals the brake apply valve 51 to transmit air from the reservoir 53 on line 52 to line 50 and hence to the second inlet 45b of the check valve 45 so as to supply air to the supply valve 39. At the same time, assuming that it is, for example, the right-hand wheel which is slipping, the isolating valve 43 associated with the opposite wheel, i.e. the left-hand wheel, is energised to block the line 36. The controller 19 causes the skid control means to be actuated to perform a repeated energisation and de-energisation of the hold solenoid so as to cause a stepwise increase in pressure of the brake operating pressure obtaining in the lines 36 and 35 and which is transmitted by the valve 42 to the wheel brake 23 but which is blocked from the brake 24 so that the left-hand wheel remains unbraked.

Such repeated energisation and de-energisation of the hold solenoid is performed until the controller 19 detects that the wheel 13 has stopped slipping, whereupon the brake apply valve 51 and the blocking valve 43 are de-energised and the hold solenoid of the skid control means 40 is also de-energised so that normal driver braking is made available to the driving wheels.

Figure 2:
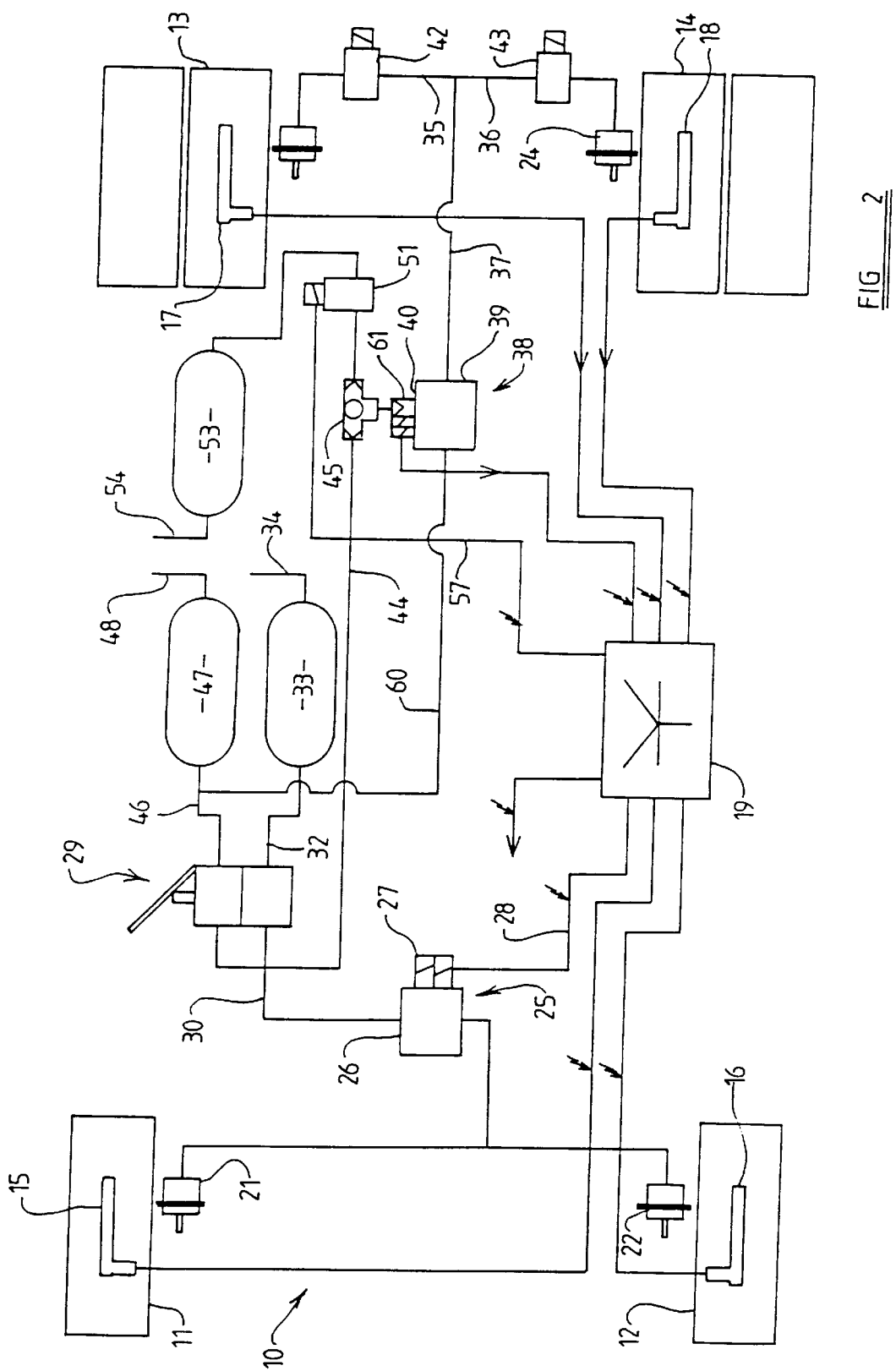
FIG. 2 is a diagrammatic illustration of a second brake system embodying the invention.

In a modification illustrated in FIG. 2 the system is as described hereinbefore. However, in this modification the supply valve 39 is a relay valve and air is supplied to the relay valve from the reservoir 47 on line 60. The brake demand signal is fed from the valve 29 on line 44 and double check valve 45 to a control chamber inlet 61 of the relay valve 39 so as to control the air pressure supplied on line 60 to provide a brake pressure on line 37 in accordance with the brake demand signal supplied on line 44. In other respects the operation of the system is as described hereinbefore with reference to FIG. 1.

Figure 3:
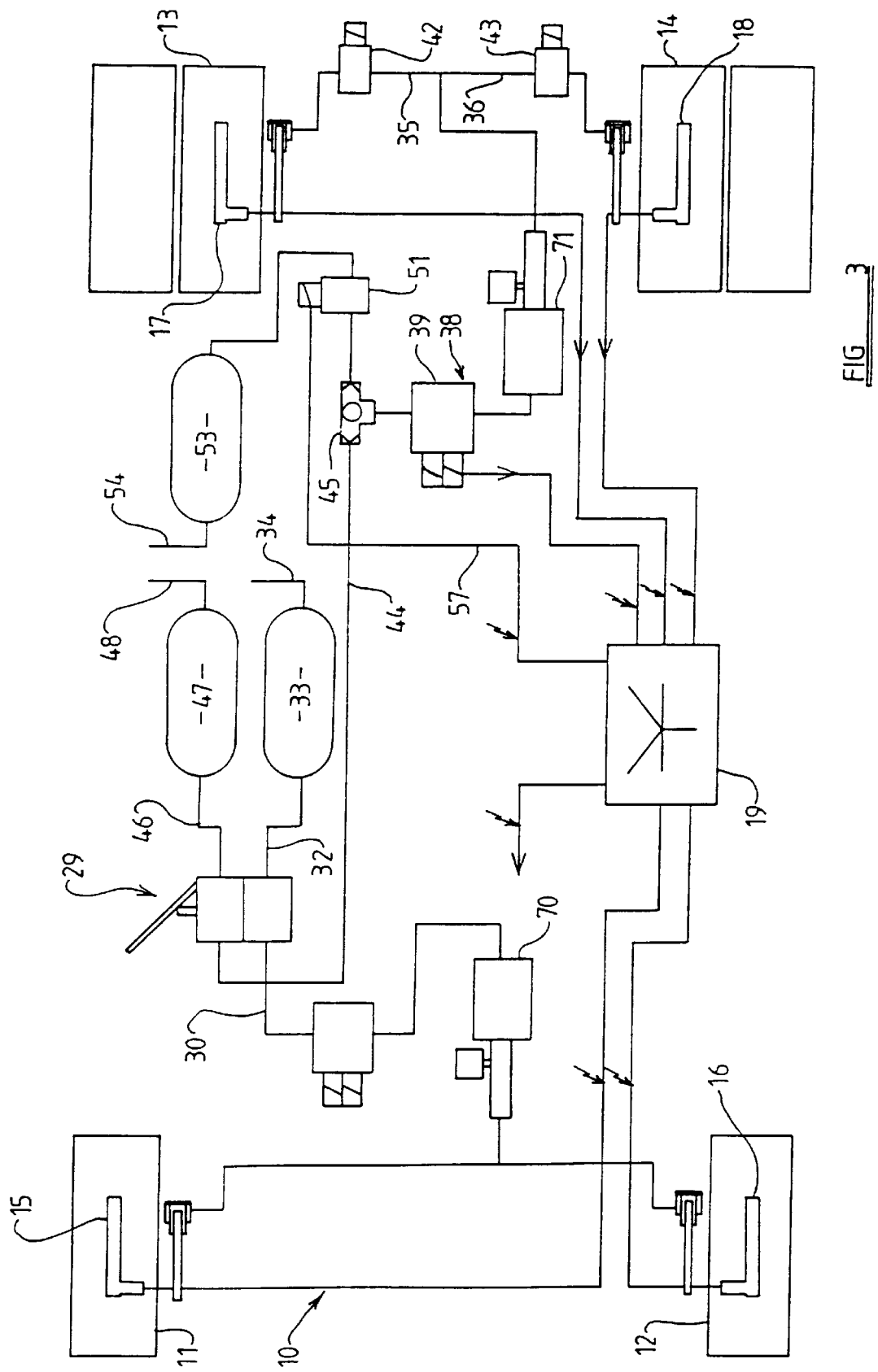
FIG. 3 is a diagrammatic illustration of a third brake system embodying the invention.

Referring now to FIG. 3, there is shown a system similar to that of FIG. 1 but in which the wheel brakes are hydraulically operated brakes and in which the hydraulic pressure fed to the brakes by a front hydraulic/pneumatic converter 70 and a rear hydraulic/pneumatic converter 71.

The isolating valves 42, 43 are operative on the hydraulic circuit downstream of the rear converter 71.

The supply valves 26, 39 are in-line supply valves and are provided on the air side of the converters 70, 71.

Figure 4:
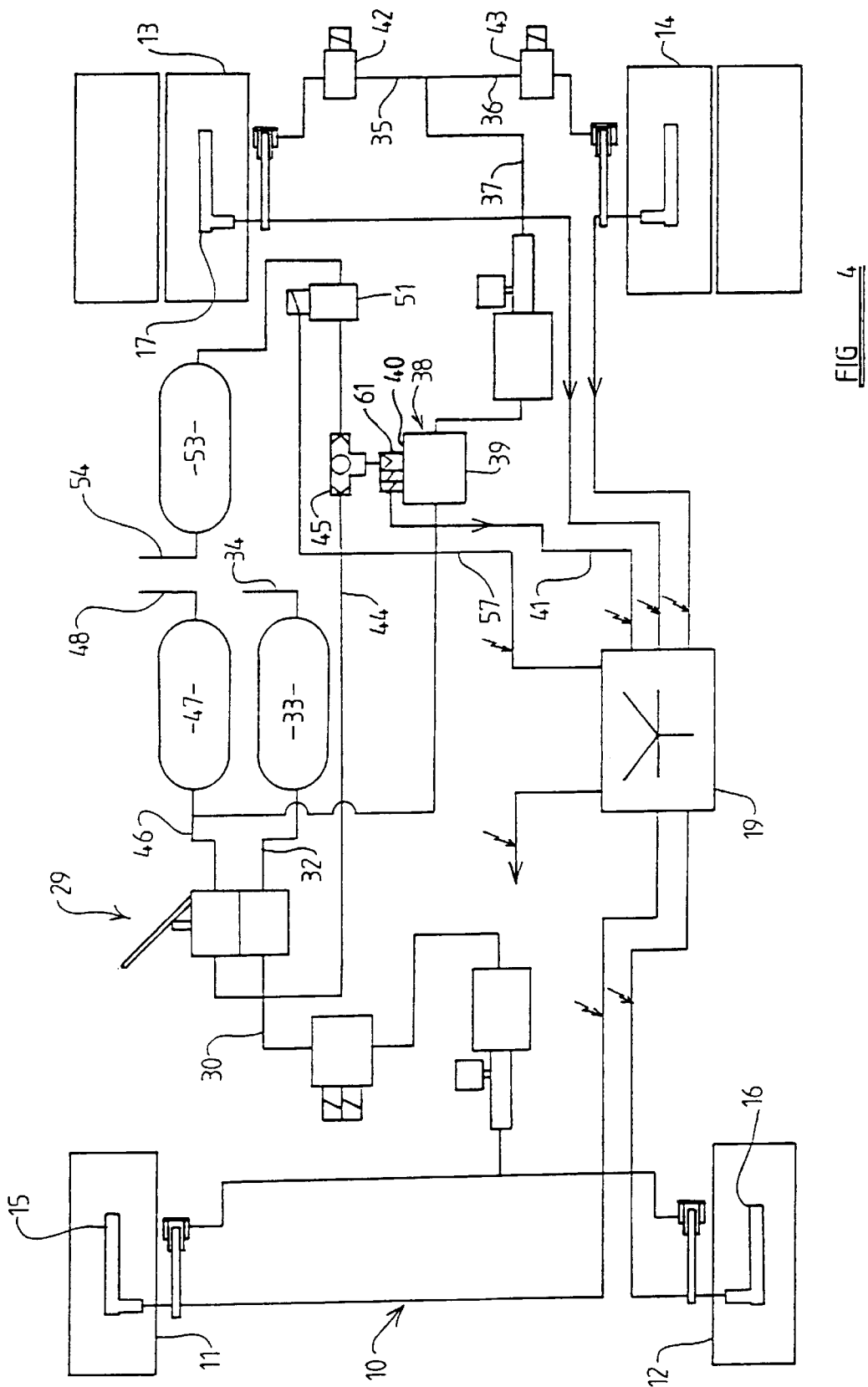
FIG. 4 is a diagrammatic illustration of a fourth brake system embodying the invention.

FIG. 4 shows a system similar to that shown in FIG. 3 but in which the supply valves are relay valves as shown in FIG. 2.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A braking system comprising an anti-lock vehicle braking system for a vehicle having a pair of drive wheels the wheels of said pair being disposed on opposite sides of the vehicle, comprising a wheel speed sensor for each wheel a controller responsive to wheel speed signals from said two wheel speed sensors for sensing skid conditions at said wheels and for generating skid control instructions, a wheel brake for each wheel responsive to hydraulic pressure, hereinafter referred to as hydraulic brake pressure, supplied thereto, a common supply line for supplying a common hydraulic brake pressure for both of said brakes a hydraulic pressure converter in accordance with a pneumatic brake demand signal comprising air under pressure, said pneumatic brake demand signal being fed to a common supply valve, said common supply valve being connected to said converter for supply of pneumatic pressure thereto in accordance with the pneumatic brake demand signal, a skid control means controlled by said skid control instructions for modulating the common hydraulic brake pressure, a brake apply valve to supply said pneumatic brake demand signal to the common supply valve in response to the controller detecting a wheel spin condition of one of said wheels and isolating means to isolate the brake associated with the other of said wheels from the common hydraulic brake pressure, wherein said converter provides the sole connection between the pneumatic brake demand signal and the hydraulic brake pressure, the skid control means being operable to modulate the common brake pressure by modulating the pneumatic pressure supplied to the converter, the common hydraulic brake pressure being responsive solely to the pneumatic pressure supplied to the converter, isolating means being provided connected between the converter and each wheel brake solely to isolate the respective wheel brake.

2. A braking system according to claim 1 wherein the air is supplied from a supply for air under pressure.

3. A braking system according to claim 1 wherein said common supply valve comprises an in-line valve.

4. A braking system according to claim 3 wherein the air to provide said pneumatic brake pressure is fed from the air supply to the common supply valve under the control of a brake pressure demand valve which may be manually operable or said brake apply valve and which provides said brake demand signal.

5. A braking system according to claim 1 wherein said common supply valve comprises a relay valve.

6. A braking system according to claim 5 wherein the air to provide said pneumatic brake pressure is fed from the air supply to the common supply valve and a brake demand signal may be supplied to the common supply valve under the control of a brake pressure demand valve which may be manually operable or said brake apply valve.

7. A braking system according to claim 1 wherein the braking system comprises a manually operable brake demand valve and wherein a double check valve is provided between the brake apply valve, the manually operable brake demand valve and the common supply valve.

8. A braking system according to claim 1 wherein the isolating valves each comprise a solenoid operated valve adapted to prevent flow of fluid therethrough when the solenoid is energised.

9. A braking system according to claim 1 wherein the skid control means is operable to provide a control of the brake pressure selected from the following modes:

permit exhaust of brake pressure to atmosphere or a low pressure region; hold brake pressure at the pressure obtaining in the vehicle brakes; permit stepwise brake pressure increase.

10. A braking system according to claim 1 wherein when a spin condition of said one wheel is detected, the controller is adapted to energise the brake apply valve and energise the isolating valve associated with the other wheel brake to cause stepwise pressure rise.

11. A braking system according to claim 1 wherein the skid control means comprises two solenoids.

12. A braking system according to claim 11 wherein one of said solenoids, hereinafter referred to as an exhaust solenoid, is adapted to connect the brake chambers to atmosphere in a low pressure region and the other of said solenoids, hereinafter referred to as a hold solenoid, is adapted to block passage of air therethough.

13. A braking system according to claim 12 wherein, in first mode, the exhaust and hold solenoids are energised so as to release brake pressure from the vehicle brakes.

14. A braking system according to claim 12 wherein, in second mode, the hold solenoid is energised and the exhaust solenoid is de-energised.

15. A braking system according to claim 12 wherein, in a third mode, the hold solenoid is repeatedly energised and de-energised and the exhaust solenoid is de-energised.

* * * * *